(12) United States Patent
Uenoyama

(10) Patent No.: US 6,812,694 B2
(45) Date of Patent: Nov. 2, 2004

(54) MAGNETIC SENSOR ADJUSTING METHOD, MAGNETIC SENSOR ADJUSTING DEVICE AND MAGNETIC SENSOR

(75) Inventor: Hirofumi Uenoyama, Nishikasugai-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/811,874

(22) Filed: Mar. 30, 2004

(65) Prior Publication Data

US 2004/0189285 A1 Sep. 30, 2004

(30) Foreign Application Priority Data

Mar. 31, 2003 (JP) ........................................ 2003-094614

(51) Int. Cl.$^7$ ................................................. G01B 7/14
(52) U.S. Cl. ............................. 324/207.22; 324/207.25
(58) Field of Search .......................... 324/160, 173–174, 324/207.11, 207.12, 207.13, 207.19, 207.2, 207.21, 207.22, 207.25, 224–225; 308/32 R, 32 H

(56) References Cited

U.S. PATENT DOCUMENTS 6,046,584 A 4/2000 Nakane et al.
6,194,893 B1 2/2001 Yokotani et al.
6,452,381 B1 9/2002 Nakatani et al.

FOREIGN PATENT DOCUMENTS

| JP | A-H10-103145 | 4/1998 |
| JP | A-H11-237256 | 8/1999 |
| JP | A-H11-304414 | 11/1999 |

*Primary Examiner*—Bot LeDynh
(74) *Attorney, Agent, or Firm*—Posz & Bethards, PLC

(57) ABSTRACT

The present invention provides a magnetic sensor adjusting method that can always be accurate in sensing a sensing target satisfactorily irrespective of fluctuations of a sensing gap length that may occur between different magnetic sensor products or in one magnetic sensor product, and that can prevent from occurring an irregularity of a phase of a binarized waveform edge. Within a magnetic gap of the magnetic sensor, a sensing gap length formed between a concave and convex portions of a sensing target units and a magnetic filed detecting sections is changed among a plurality of setting values. Then, the magnetic filed detecting sections 3, 5 obtain detection waveforms 201, 202 in every setting values of the sensing gap length. Next, an intersection point level value AG0 obtained by superimposing the plurality of detection waveforms in phase is calculated. Then, a threshold value $V_{TH}$ is adjusted so as to agree with the calculated intersection point level value AG0.

12 Claims, 10 Drawing Sheets g1<g2

SENSOR INTERNAL WAVEFORM

PROCESS 1

SMALLER SENSING GAP SEGMENT | LARGER SENSING GAP SEGMENT

⇩ DIVIDED DATA EVERY 180deg → SUPERIMPOSE (SEE BELOW)

PROCESS 2

⇩ CALCULATE AGO POINT

PROCESS 3

MAGNETIC SENSOR ADJUSTING METHOD, MAGNETIC SENSOR ADJUSTING DEVICE AND MAGNETIC SENSOR

TECHNICAL FIELD

The present invention relates to a magnetic sensor adjusting method, a magnetic sensor adjusting device and the magnetic sensor itself.

BACKGROUND OF THE INVENTION

Some rotational sensors and length measuring sensors use magnetic sensors. Among various types of magnetic sensors, some magnetic sensors use a method in which a magnetic sensing target that rotates or moves along with a sensing object is disposed in a magnetic field, a variation of the magnetic field, according to the movement of the magnetic sensing target, is detected by a magnetic field detecting element such as a magnetoresistance effect element (MR element: JP-A-11-304,414 and JP-A-11-237,256) and a Hall element (JP-A-10-103,145) and, then, a rotation angle or a moving distance of the magnetic sensing target is calculated using the detected waveforms. Such a magnetic sensor is used because it has a relatively simple construction and high accuracy. For example, there is known a magnetic sensor for automobiles, that detects crank angles and the like by disposing a gear made of a soft magnetic material that has concave and convex portions formed on a outer circumferential surface so that it is opposed to a magnetic field generating magnet so as to create a magnetic gap therebetween, disposing a magnetic field detecting element (an MR element is often used because it is inexpensive and can be miniaturized easily) in the magnetic gap and, then, detecting a rotational position of the gear according to the output waveform of the magnetic field detecting element (JP-A-11-304,414 and JP-A-11-237,256). As the concave and convex portions form, with the magnetic field detecting element, respective sensing gap lengths that differ from each other, significant fluctuations occur in the magnetic field in the magnetic gap and, in particular, when the boundary regions between the concave and convex portions pass through the magnetic gap, which appear as variations in the waveform level detected by the magnetic detecting element. In actual sensors, this waveform is binarized (turned into a square wave) by a comparator and the like and the rotational position is determined based on the level transition edges.

Here, if the sensing gap lengths formed between the gear and the magnet are uneven between sensors due to factors such as errors in attachment or if the heights of the concave and convex portions in one gear are uneven due to the accuracy of finishing the gear and other factors, there may occur a problem that angle detection accuracy is degraded. Further, eccentricity of the rotation axis of the gear may also cause fluctuations in the sensing gap length according to the angular phase. More specifically, as the sensing gap becomes larger, the transition of the waveform level becomes less sharp when the boundary regions, between the concave and convex portions of the gear, pass through the sensing gap and, conversely, as the sensing gap becomes smaller, the transition of the waveform level becomes sharper. As a consequence, positions of the transition edges after binarization become irregular depending on the sensing gap length and, thus, the accuracy in detecting rotational positions is degraded. Such problem occurs not only in the rotational sensors but also in the length measuring sensors and, further, sensors using sensing targets other than the concave and convex portions (for example, when magnetic rotors or magnetic scales are used, regions having polarities opposite to each other that are disposed alternately substitute for the role of the concave and convex portions) in a similar manner.

JP-A-10-103,145 addresses this problem as follows. Even if the waveform before binarization fluctuates due to the unevenness of the sensing gap length, in terms of one pair of the concave and convex portions, the accuracy of the waveform cycle can be maintained so long as dimensional accuracy, in forming the concave and convex portions, is ensured. In this case, in the waveform after the binarization, the repetition period between a first level segment corresponding to the convex portion and a second level segment corresponding to the concave portion is constant in itself. Therefore, among the transition edges (binarized edges) between the first level segment and the second level segment, by adopting only one of either the rising edge and the falling edge as the sensing signal, the angle sensing accuracy can be assured by the dimensional accuracy in forming the concave and convex portions.

However, the above solution has the following problems:

(1) in the above solution, though the repetition period of the waveform is constant in itself, the phase of the binarized edge positions is irregular depending on the shape of the waveform and, therefore, does not uniquely correspond to the concavo-convex phase of the gear. It becomes a serious problem when the phase of attachment of the gear to the sensing object must be managed. For example, in the case of an angle sensor for detecting a crank angle of automobiles, if the gear is attached with respect to the concavo-convex phase, the irregularity of the phase of the binarized edge positions described above may adversely affect operations such as ignition timing control that is performed referentially; and (2) because only one of the rising edge and the falling edge formed in the binarized waveform can be adopted, resolution of the angle sensing is reduced significantly in comparison with other solutions using both edges. Conversely, in order to implement the resolution comparable to the other solutions using both edges, the number of the concave and convex portions must be doubled but, as a result, the cost of machining the gear is increased and it becomes difficult to ensure the accuracy.

SUMMARY OF THE INVENTION

It is an object of the present invention to provide a magnetic sensor adjusting method that solves the above problems, a magnetic sensor adjusting device used for the method and the magnetic sensor.

It is another object of the present invention to provide a magnetic sensor adjusting method that can always be accurate in sensing a sensing target satisfactorily irrespective of fluctuations of a sensing gap length that may occur between different magnetic sensor products or in one magnetic sensor product, a magnetic sensor adjusting device used for the method and the magnetic sensor.

It is yet another object of the present invention to provide a magnetic sensor adjusting method that can prevent an irregularity of a phase of a binarized waveform edge, a magnetic sensor adjusting device used for the method and the magnetic sensor.

It is yet another object of the present invention to provide a magnetic sensor adjusting method that can always be accurate in sensing a sensing target satisfactorily irrespective of fluctuations of a sensing gap length that may occur between different magnetic sensor products or in one magnetic sensor product and that can prevent from occurring an irregularity of a phase of binarized waveform edges, a magnetic sensor adjusting device used for the method and the magnetic sensor.

According to the present invention, there is provided a method for adjusting a magnetic sensor including:

a magnet for generating a magnetic field;

a sensing target unit in which a first sensed portion and a second sensed portion are magnetically inequivalent to each other, are disposed along a moving path passing through a position opposed to the magnet through a magnetic gap, and can be moved integrally along the moving path;

a magnetic field detecting section for detecting magnetic field fluctuations in the magnetic gap based on the fact that the first sensed portions and the second sensed portions pass through the magnetic gap alternately;

a waveform processing section for binarizing detection waveform detected by the magnetic field detecting section based on a predetermined threshold; and a threshold adjusting and setting section for setting the threshold so that it can be adjusted relatively with respect to the detection waveforms, the method comprising the steps of:

obtaining detection waveforms for a plurality of setting values by the magnetic field detecting sections while changing sensing gap lengths, which are formed between the first sensed portion or the second sensed portion and the magnetic field detecting sections in the magnetic gap, among the plurality of setting values;

calculating an intersection point level value indicated by an intersection point between a plurality of detection waveforms detected for the plurality of setting values when the plurality of detection waveforms are superimposed in phase; and adjusting the threshold so that it agrees with the intersection point level value.

Further, according to the present invention, there is provided a device for adjusting a magnetic sensor, comprising:

a magnet for generating a magnetic field;

a sensing target unit in which a first sensed portion and a second sensed portion, which are magnetically inequivalent to each other, are disposed along a moving path passing through a position opposed to the magnet through a magnetic gap, and can be moved integrally along the moving path;

a magnetic field detecting section for detecting magnetic field fluctuations in the magnetic gap based on the fact that the first sensed portions and the second sensed portions pass through the magnetic gap alternately;

a waveform processing section for binarizing detection waveform detected by the magnetic field detecting section based on a predetermined threshold;

a threshold adjusting and setting section for setting the threshold so that it can be adjusted relatively with respect to the detection waveforms;

a sensing gap length changing and setting section for changing and setting sensing gap lengths, which are formed between the first sensed portion or the second sensed portion and the magnetic field detecting section in the magnetic gap, among a plurality of setting values;

a detection waveform obtaining section for obtaining detection waveforms for the plurality of setting values by the magnetic field detecting sections; and an intersection point level value calculating section for calculating an intersection point level value indicated by an intersection point between a plurality of detection waveforms detected for the plurality of setting values when the plurality of detection waveforms are superimposed in phase.

Still further, according to the present invention, there is provided a magnetic sensor, comprising:

a magnet for generating a magnetic field;

a sensing target unit in which a first sensed portion and a second sensed portion, which are magnetically inequivalent to each other, are disposed along a moving path passing through a position opposed to the magnet through a magnetic gap, and can be moved integrally along the moving path;

a magnetic field detecting section for detecting magnetic field fluctuations in the magnetic gap based on the fact that the first sensed portions and the second sensed portions pass through the magnetic gap alternately;

a waveform processing section for binarizing detection waveform detected by the magnetic field detecting section based on a predetermined threshold; and a threshold adjusting and setting section for setting the threshold so that it can be adjusted relatively with respect to the detection waveforms, wherein a first detection waveform is obtained by changing a sensing gap length, which is defined to be a predetermined specific value between the first sensed portions or the second sensed portions and the magnetic field detecting sections in the magnetic gap, from the specific value forcibly, a second detection waveform is obtained according to the sensing gap length that is defined to be the specific value, and the threshold is adjusted so that it agrees with an intersection point level value that is indicated by an intersection point between the first detection waveform and the second detection waveform when the first detection waveform and the second detection waveform is superimposed in phase.

The present invention described above is applied to a magnetic sensor wherein a sensing target unit, in which first sensed portions and second sensed portions are magnetically inequivalent to each other and disposed along a predetermined moving path alternately, is opposed to a magnet through a magnetic gap, magnetic field fluctuations in the magnetic gap when an array of the two types of the sensed portions is moved integrally along the above moving path are detected by a magnetic field detecting sections, and the detection waveforms are binarized based on a predetermined threshold. When a sensing gap length between the first sensed portions or the second sensed portions and the magnetic field detecting sections varies, an amplitude of the obtained detection waveforms is changed and crests and troughs of the waveforms are broaden or sharpened accordingly but, as a result of consideration, the inventor of the present invention has found that the detection waveforms intersect each other at a substantially fixed intersection point irrespective of the sensing gap length when the waveforms that are changed by the effect of the sensing gap length are superimposed on each other so that the phases of the waveforms agree with each other (or, are in phase).

Therefore, in the present invention, a threshold for binarizing the waveforms is set so that it agrees with this intersection point level value. As described above, when a plurality of waveforms obtained by changing the sensing gap length, which intersect each other at the intersection point described above, are binarized with reference to the threshold agreeing with the intersection point level value, the phase of the binarized edges is constant irrespective of the detection waveforms and, thus, of the set values of the sensing gap length. Therefore, even when the sensing gap length fluctuates between different magnetic sensor products or in one magnetic sensor product, accuracy in sensing the sensed portions can be always set satisfactorily irrespective of the fluctuations.

Further, when the sensing gap length fluctuates, though the waveform shapes vary according to the sensing gap length, the phase of the binarized edge positions is always substantially constant. A phase relationship between the first sensed portions and the second sensed portions in the sensing target unit can be uniquely defined independently of the sensing gap length. Therefore, even when the phase of attachment of the sensing target unit must be managed, accuracy of the phase is not degraded by the fluctuations of the sensing gap length.

Still further, as the phase of both the rising edge and the falling edge occurring in the binarized waveform can be assured, the both edges can be used as detection signals with high accuracy. In this case, either one edge may be used or the resolution of the angle sensing may be increased by using the both edges.

As an example of specific effects of the present invention, when it is applied to an angle sensor for detecting a crank angle of automobiles, the phase of the binarized waveform is not affected by the sensing gap length and defined substantially uniquely by attaching the sensing target unit to a rotation axis with reference to the phase of the first sensed portions and the second sensed portions. Therefore, operations such as ignition timing control that is performed referentially can be performed more accurately.

The magnetic sensor of the present invention that is obtained by adjusting the binarization threshold according to the method of the present invention as described above is not likely to cause the unevenness of the sensing accuracy between different magnetic sensor products and is not likely to be affected by the unevenness of the sensing gap length in the array of the first sensed portions and the second sensed portions in one magnetic sensor product, the accuracy of attachment of the sensing target unit, or secular changes of the sensing gap length in the magnetic sensor that has been attached. In this case, it can be checked easily whether the binarization threshold of the magnetic sensor agrees with the intersection point level value of the waveforms as described above or not by the following procedure. Thus, in magnetic sensor products, the sensing gap length is set to a specific value unique to each product. So, either the magnet or the first and second sensed portions is moved intentionally in order to change the sensing gap length from the specified value and, then, detection waveforms before and after the change are measured. If the threshold is adjusted according to the present invention as described above, the intersection point level value obtained by superimposing the both detection waveforms in phase agrees with the threshold. Here, when the sensing gap length is changed, the change on the order of 20% of the sensing gap length set as the specific value unique to each product is sufficient to estimate the intersection point level value.

In the present invention, "magnetic inequivalence" between the first sensed portions and the second sensed portions in the sensing target unit means that magnetizing conditions in the magnetic field by the magnet differ between the first sensed portions and the second sensed portions when each of the first and second sensed portions reaches the position opposite to the magnet. When the first and second sensed portions have different magnetizing conditions, the magnetic fields generated as the first sensed portions and the second sensed portions are magnetized are distributed differently and interact with the magnetic field of the magnet differently from each other (for example, orientations of combined magnetic fields). Therefore, the magnetic field distribution in the magnetic gap varies as the first sensed portions or the second sensed portions are approaching.

An example of the combination of the first sensed portions and the second sensed portions that are inequivalent magnetically is that of concave portions and convex portions made of a ferromagnetic material that have heights different from each other in the direction of the magnetic gap length. In this case, in the concave portions, the distance to the magnet or the magnetic gap length is increased and the degree of magnetization is reduced but, in the convex portions, this relationship is inverted. These concave and convex portions are desirably made of a soft magnetic material that can be magnetized easily (such as Permalloy, for example). Further, the first sensed portions and the second sensed portions may be formed as polarized regions of a permanent magnet that have polarities opposite to each other. Still further, a combination of ferromagnetic materials that differ from each other in terms of magnetic susceptibility or saturation magnetization may be used or, alternatively, one of the first and second sensed portions may be formed of a ferromagnetic material and the other may be formed of a non-magnetic material (a paramagnetic or diamagnetic material: for example, austenitic stainless steels, non-magnetic metals such as copper or aluminum and polymeric materials such as plastics).

Further, the magnet for generating the magnetic field may be either a permanent magnet or an electromagnet. The magnetic gap (and the sensing gap) may be formed by an empty space or at least a part of the magnetic gap may be filled with a non-magnetic material. Still further, the magnetic field detecting sections for detecting magnetic field fluctuations may be well-known MR elements or may be selected from various alternatives such as Hall elements, pick-up coils and magnetic heads.

When the sensing gap length is changed to calculate the intersection point level value, the range of changing the sensing gap length should be 20% to 200% of its median. If the changing range of the sensing gap length is less than 20%, a difference between the detected waveforms obtained by changing the sensing gap length may be too small to read the intersection point level value. But, if the changing range of the sensing gap length exceeds 200%, the intersection point level value defined between the waveforms may become not constant and lose their meaning as the target value for the threshold setting.

On the other hand, when the changing range of the sensing gap length falls within 20–200%, the intersection point level values when the detection waveforms are obtained with regard to three or more levels of the sensing gap lengths in this range can substantially agree with each other within a deviation of 20% and, therefore, sufficient accuracy in setting the threshold can be maintained even if the sensing gap lengths used for the measurement are somewhat uneven. For example, when the detection waveforms are obtained by using three or more levels of the sensing gap lengths, the intersection point levels between the waveforms may sometimes not agree with each other. But, so long as their deviation stays within the range described above, the intersection point levels can be considered to be in agreement with each other substantially. In this case, any of the intersection point levels may be selected as the threshold with which the intersection point levels agree or the threshold may agree with an average value of these intersection point levels. Further, in the present invention, when a plurality of intersection point levels are determined to set the threshold as described above, too, so long as the deviation between the threshold and each intersection point level stays within 20%, these values can conceptually be considered to be in agreement with each other.

Therefore, in the easiest way, there can be exemplified a method, wherein the sensing gap length is changed between two levels and an intersection point level value of two detection waveforms obtained according to the two sensing gap lengths is calculated as a target value with which the threshold should agree. In this case, in order to adequately bring out the effect of the present invention, it is desirable to set the two levels of the sensing gap lengths so that the difference between them is as large as possible within the preferable changing range described above.

The magnetic sensor to which the present invention is applied may be a rotational sensor, in which the sensing target unit is a body of revolution, a locus of a circumferential side surface about a rotation axis line of the body of revolution constitutes a moving path, and the first sensed portions and the second sensed portions are disposed alternately along the circumferential side surface. By adopting the present invention, the accuracy in detecting the angular phase of rotation can be improved significantly. However, the present invention is not limited to rotational sensors but may also be applied to length measuring sensors such as linear encoders, for example.

Next, in the present invention, in order to change the sensing gap length of the magnetic sensor, the first and second sensed portions and the magnetic field detecting sections must be moved relatively. But, in terms of mass production of the magnetic sensors, it is quite cumbersome and, therefore, not practical, to change the mounting position of the magnetic field detecting sections in the manufacturing process. Therefore, it is effective to adopt a method in which an adjustment is performed by replacing a normal sensing target unit with a sensing target unit dedicated for the adjustment and, then, the normal sensing target unit is attached. Once the adjustment according to the present invention is completed, the magnetic sensor is hardly affected even if the sensing gap length is somewhat uneven when the normal sensing target unit is attached.

In this case, though the adjustment may be performed by successively changing a plurality of sensing target units for adjustment, which are prepared in advance to have sensing gap lengths different from each other, and measuring the detection waveforms corresponding to the respective adjusting sensing target units individually, it is cumbersome to change the adjusting sensing target units and the adjustment may be affected by errors in attachment when the adjusting sensing target units are changed.

Therefore, in the present invention, the adjusting method as described below can be adopted. Thus, in place of the normal sensing target unit having a constant sensing gap length, a variable-gap sensing target unit for adjustment, in which segments having different sensing gap lengths coexist, is attached to the magnetic sensor while the magnet is attached to a fixed position and, then, sensing waveforms according to the first and second sensed portions are obtained for each of the segments of the variable-gap sensing target unit having different sensing gap lengths.

In this case, the adjusting device of the present invention can be constituted as follows. Thus, a sensing gap changing and setting means comprises a variable-gap sensing target unit for adjustment, which is attached to a magnetic sensor to be adjusted temporarily in place of a normal sensing target unit having a uniform sensing gap length and in which segments having different sensing gap lengths coexist. Then, a detection waveform obtaining means obtains sensing waveforms according to first and second sensed portions for each of the segments of the variable-gap sensing target unit having different sensing gap lengths.

According to the method and device of the present invention described above, as the segments having the different sensing gap lengths coexist in one variable-gap sensing target unit, a plurality of detection waveforms for calculating an intersection point level value can be obtained at a time without changing adjusting sensing target units and, as a result, an adjustment process can be simplified. Further, as the process to change the adjusting sensing target units is not needed, there is no possibility that the adjustment is affected by errors in attaching the adjusting sensing target units.

For example, in the case of a rotational sensor, in which a normal sensing target unit is a body of revolution, a locus of a circumferential side surface about a rotation axis line of the body of revolution constitutes a moving path, and first sensed portions and second sensed portions are disposed alternately along the circumferential side surface, it is possible to use a variable-gap sensing target unit, in which a plurality of segments having turning radii different from each other are disposed along the circumferential side surface of a body of revolution and first sensed portions and second sensed portions are disposed in each segment so that the plurality of segments have sensing gap lengths that are defined according to the turning radii and, therefore, different from each other. In this case, by dividing the circumferential side surface of the body of revolution into equiangular segments so that the turning radii are different between the adjacent equiangular segments and, therefore, the sensing gap lengths are changed every specified angular period (for example, 180°), detection waveforms corresponding to the sensing gap lengths that are changed every specified angular period can be obtained and processes for determining the intersection point level value, such as dividing the waveforms and superimposing them in phase, can be performed easily and with high accuracy.

In this connection, as the detection waveforms detected by the magnetic field detecting sections often vary depending on temperature characteristics of the detecting sections and signal processing circuits, even if the magnetic sensor is adjusted so that the threshold agrees with the intersection point level value at a given temperature, the threshold may be deviated from the intersection point level value as the temperature varies and detection accuracy may be degraded. However, when the adjustment is performed once so that the threshold agrees with the intersection point level value but, after that, the threshold is deviated from the intersection point level value again due to the temperature fluctuations, if an attempt is made to eliminate this difference by changing the threshold relative to the waveforms, the threshold will be deviated from the intersection point level value again at the temperature at which the adjustment has been performed initially and, after all, the adjustment condition cannot be assured over all temperature ranges as intended. Further, though it is not impossible to correct the threshold to follow the temperature change, this solution is not practical because it complicates the sensor system.

In view of the above problem, in the magnetic sensor to which the present invention is applied, it is desirable to provide a temperature correcting section for correcting temperature-dependent fluctuations of the detection waveforms detected by the magnetic field detecting sections and set a correction coefficient by the temperature correcting section so that the binarization threshold of the detection waveforms agrees with the intersection point level value over all predetermined temperature ranges. In other words, after the adjustment is performed so that the threshold agrees with the intersection point level value at a given temperature once, any difference between the threshold and the intersection point level value due to the temperature fluctuations is eliminated by adjusting the correction coefficient of the temperature correcting section. As a result, the adjustment condition of the threshold can be assured over all necessary temperature ranges as intended.

As a specific method, the correction coefficient is set by obtaining two detection waveforms by the magnetic field detecting sections and allowing the threshold to agree with a first intersection point level value, which is determined by the two detection waveforms, by the threshold adjusting and setting section while a temperature is set to a first temperature and two levels of sensing gap lengths are used; and, in this condition, obtaining two detection waveforms by the magnetic field detecting sections again and calculating a second intersection point level value determined by the two detection waveforms that are detected again while the threshold set by the threshold adjusting and setting section is not changed, the temperature is changed to a second temperature that is different from the first temperature and two levels of sensing gap lengths are used; and setting the correction coefficient so that the second intersection point level value agrees with the threshold.

According to this method, by setting only two levels of measured temperatures, the agreement between the threshold and the intersection point level value can be obtained easily in a temperature-compensated manner around the measured temperatures and, as a result, the magnetic sensor that is not susceptible not only to unevenness of the sensing gap length but also to temperature fluctuations can be obtained.

BRIEF DESCRIPTION OF THE DRAWINGS

The invention will be more clearly understood after reference to the following detailed description of preferred embodiments read in conjunction with the drawings, wherein.

DETAILED DESCRIPTION OF PREFERRED EMBODIMENTS

Hereinafter, embodiments of the present invention will be described with reference to the drawings.

Figure 1:
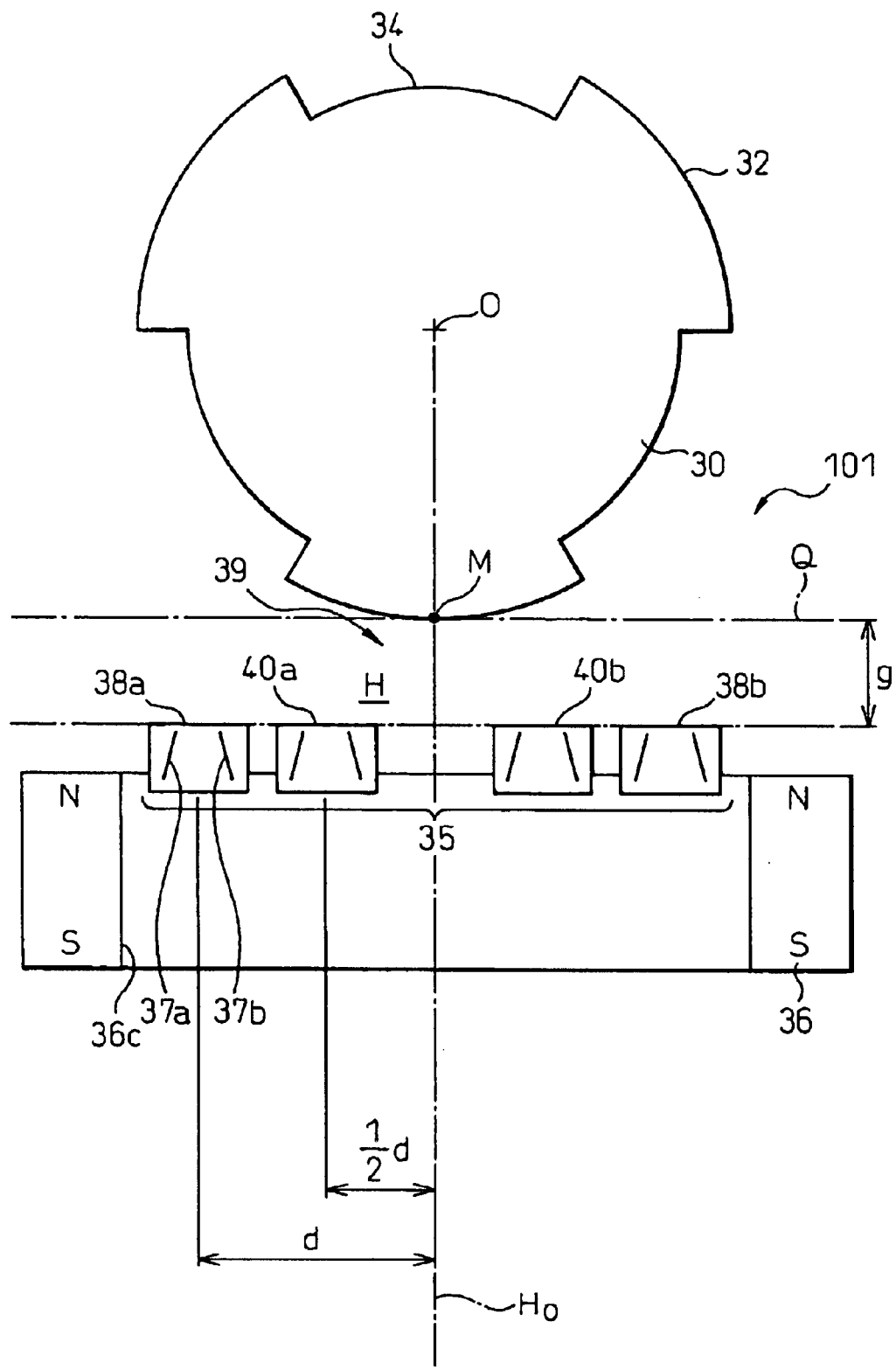
FIG. 1 is a schematic diagram showing an example of a sensing section of a magnetic sensor to which the present invention is applied.

FIG. 1 shows a sensing section 101 of a magnetic sensor to which the present invention is applied. In this embodiment, the magnetic sensor is constituted as a rotational sensor. The sensing section 101 has a magnet 36 that generates a magnetic field, a sensing target unit 30 that is a body of revolution disposed opposite to the magnet 36 so as to form a magnetic gap therebetween, and magnetic field detecting sections 38a, 38b, 40a and 40b that detect magnetic field fluctuations in the magnetic gap.

The sensing target unit 30 is formed as a disc made of a ferromagnetic material (for example, a soft magnetic metallic material such as Permalloy) as a whole and, along its circumferential side surface, concave portions 34 and convex portions 32 having heights different from each other in the direction of the magnetic gap length are formed as first sensed portions and second sensed portions that are magnetically inequivalent to each other. Then, a central axis line 0 of the sensing target unit 30 is disposed so that it is concentric with a rotation axis that is a target of rotation detection (not shown, for example, a automobile's crankshaft or other shaft elements that rotate interlockingly with the crankshaft) and rotates with the rotation axis integrally. With this rotation, the concave portions 34 and the convex portions 32 that are the first sensed portions and the second sensed portions rotate integrally along a locus of rotation of the circumferential side surface of the sensing target unit 30. Then, the gap between the magnetic field detecting sections 38a, 38b, 40a, 40b and the concave portions 34 or the convex portions 32 functions as a sensing gap 39.

The magnet 36 is a permanent magnet and the sensing target unit 30 is disposed so that its circumferential side surface faces the center of the magnetic field generated by the magnet 36. In this embodiment, the sensing target unit 30 is positioned with respect to the magnet 36 so that the central axis line of the magnetic field $H_0$ is orthogonal to the rotation axis line of the sensing target unit 30.

More specifically, the magnet 36 is formed in a ring-like shape with a cavity 36c and polarized in the axial line to have two magnetic poles and, then, the circumferential side surface of the sensing target unit 30 is disposed so that it faces one opening of the magnet 36.

In this embodiment, the four magnetic field detecting sections 38a, 38b, 40a and 40b are disposed in the direction of the diameter of the opening, which corresponds to the circumferential side surface of the sensing target unit 30 of the magnet 36, two by two in a bilateral symmetrical manner with respect to the center of the magnetic field $H_0$. Here, the sensing gap length differs between the concave portions 34 and the convex portions 32 and, further, strictly speaking, differs depending on the positions where the four magnetic field detecting sections 38a, 38b, 40a and 40b are attached.

In this embodiment, assuming a plane Q that is orthogonal to the center of the magnetic field $H_0$ passing through the crosswise center M of the convex portion 32 when the center M reaches the center of the magnetic field $H_0$, the sensing gap length is defined as an average value g of the distances from the plane Q to each of the magnetic field detecting sections 38a, 38b, 40a and 40b.

Figure 2:
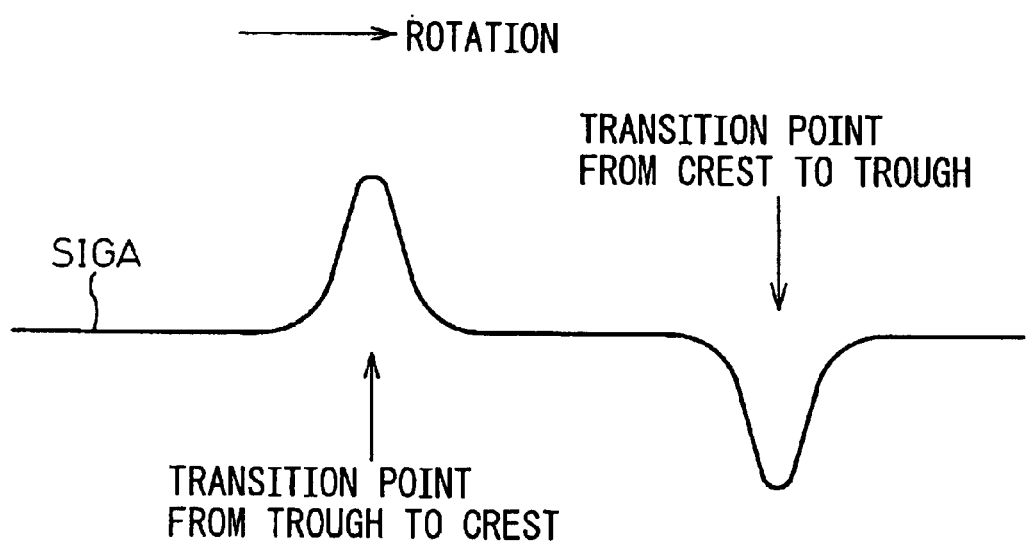
FIG. 2 is a diagram for describing a principle to make a detected waveform steeper by using two magnetic field detecting sections.
Figure 2:
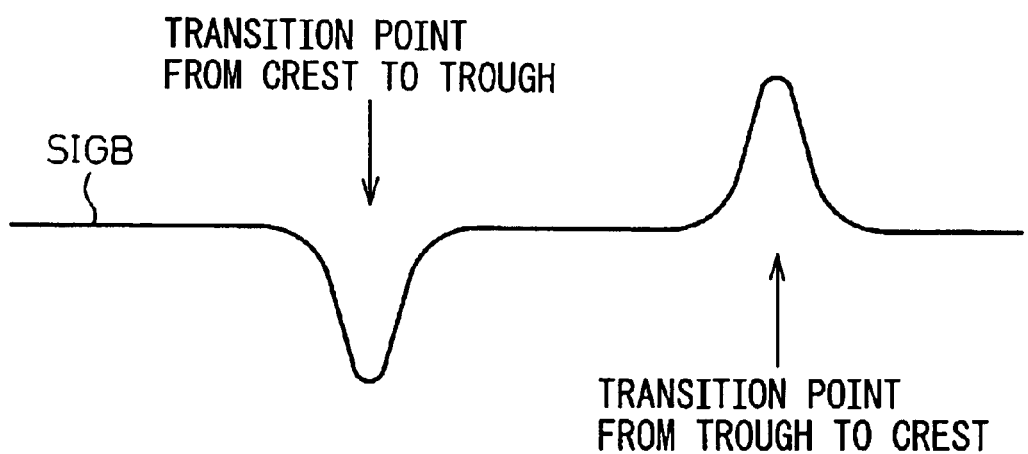

Among the magnetic field detecting sections 38a, 38b, 40a and 40b, the distance between two magnetic field detecting sections 38a and 38b positioned on the outside (hereinafter also referred to as the first magnetic field detecting sections) is defined so that the left and right magnetic field detecting sections 38a and 38b sense the transition edges from the concave portion 34 to the convex portion 32 and from the convex portion 32 to the concave portion 34 always with the same timing. As a result, as shown in FIG. 2, in a detected waveform SIGA of one magnetic field detecting section 38a and a detected waveform SIGB of the other magnetic field detecting section 38b, the transition edges from the concave portion 34 to the convex portion 32 and the transition edges from the convex portion 32 to the concave portion 34, the amplitude of which is inverted from each other, appear in phase. Therefore, by calculating the difference signal between the both detected waveforms (hereinafter referred to as the first difference signal), the waveform peaks associated with the detection of the transition edges can be made steeper and the rotation detection accuracy can be improved.

On the other hand, two magnetic field detecting sections 40a and 40b positioned on the inside (hereinafter also referred to as the second magnetic field detecting sections) are positioned substantially at the midpoint of the distance d from the center of the magnetic field $H_0$ to each of the first magnetic field detecting sections 38a and 38b, respectively. The difference signal from the detected waveforms of the second magnetic fields 40a and 40b (hereinafter referred to as the second difference signal) is also generated. Then, the third difference signal is generated between the first difference signal and the second difference signal described above. By using this third difference signal, there can be attained an effect that an intersection point level value described later can be kept constant even when the width (the lateral length) of the convex portion 32 or the concave portion 34 fluctuates.

Figure 4:
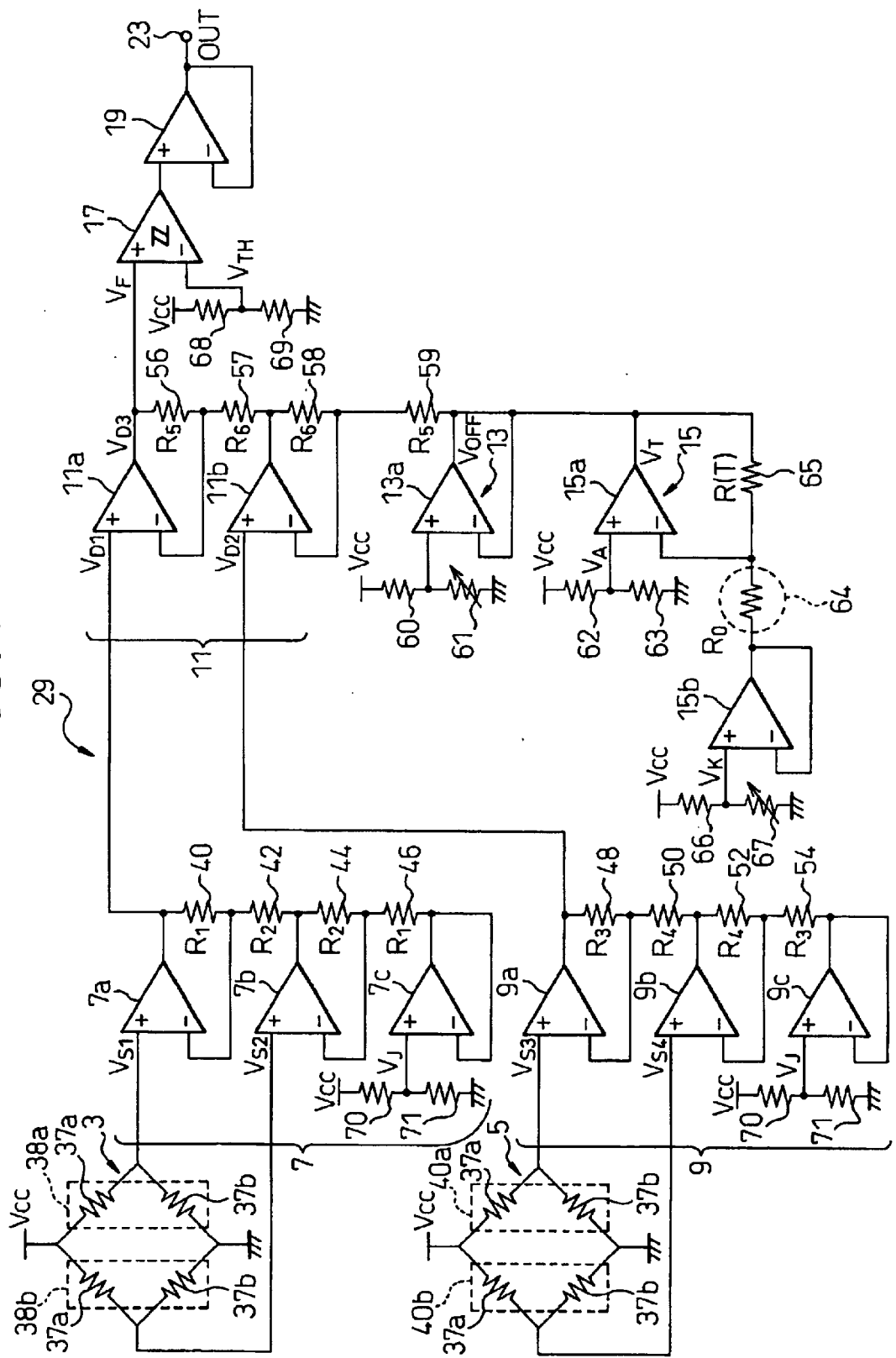
FIG. 4 is a circuit diagram showing a specific example of the sensor control circuit of FIG. 3.

In this embodiment, each of the magnetic field detecting sections 38a, 38b, 40a and 40b is constituted by an MR element. The MR element is of a well-known type (for example, made of an alloy of Ni, Fe and Co) and is frequently used as the magnetic field detecting section of the magnetic sensor because it can detect the variation of the magnetic field as the significant variation of the resistance of the element. As shown in FIG. 4, each of the magnetic field detecting sections 38a, 38b, 40a and 40b takes the form of a resistance bridge, in which respective pairs of MR element films are connected serially as resistive elements 37a and 37b to a detection power source Vcc. The film configuration and disposition of the two resistive elements 37a and 37b is determined so that these elements represent the variation of the resistance inversely to each other when the magnetic field fluctuates in an inclined direction on the film surfaces from the center of the magnetic field of the magnet 36. As a result, a voltage division ratio between the two resistive elements 37a and 37b varies significantly by receiving the magnetic field fluctuation, the variation of the divided voltage of the two resistive elements can be obtained as a waveform output.

AS shown in FIG. 1, in this embodiment, the MR element films constituting the resistive elements 37a and 37b are formed linearly and disposed in a V-shaped configuration on substrates, which is positioned, in turn, in parallel with the center of the magnetic field $H_0$, so that the longitudinal direction of each MR element film forms an angle of 45° with the center of the magnetic field $H_0$ and the distance between the resistive elements 37a and 37b is reduced on the side facing the sensing target unit 30. Further, the first magnetic field detecting sections 38a and 38b are disposed so that the transition edge from the concave portion 34 to the convex portion 32 is positioned at the center of one of the resistive elements 37a and 37b when the transition edge from the convex portion 32 to the concave portion 34 is positioned at the center of the other.

Figure 3:
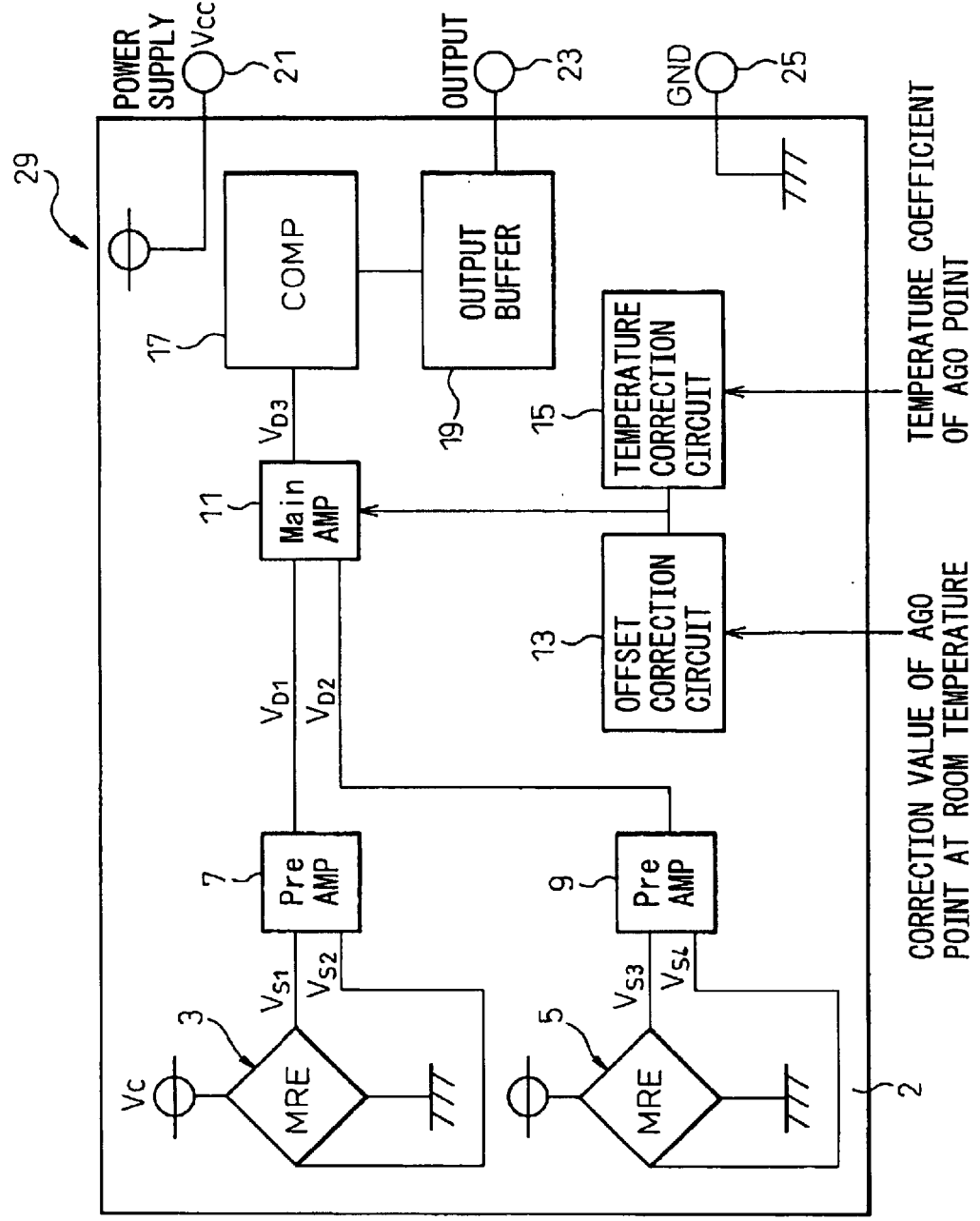
FIG. 3 is a block diagram showing an example of a sensor control circuit of the magnetic sensor to which the present invention is applied.

FIG. 3 is a block diagram showing an exemplary electrical configuration of a sensor control circuit 29 used for the sensing section 101 of FIG. 1. The sensor control circuit 29 includes a first MR bridge 3 in which the four resistive elements (MR elements) constituting the first magnetic field detecting sections 38a and 38b are disposed on each side, and a second MR bridge 5 in which the four resistive elements (MR elements) constituting the second magnetic field detecting sections 40a and 40b are disposed on each side so that the output voltages $V_{s1}$, $V_{s2}$ and $V_{s3}$, $V_{s4}$ of the resistance voltage dividing points of the first and second magnetic field detecting sections 38a, 38b and 40a, 40b are input to a first preamplifier 7 for generating a first difference signal $V_{D1}$ and a second preamplifier 9 for generating a second difference signal $V_{D2}$, respectively. Then, the difference signal output voltages $V_{D1}$ and $V_{D2}$ of the preamplifiers 7 and 9 are input to a main amplifier 11 for generating a third difference signal $V_{D3}$. With regard to the signal waveform of the third difference signal $V_{D3}$ output from the main amplifier 11, offset level adjustment is performed by an offset correction circuit 13 and temperature correction is performed by a temperature correction circuit 15. Then, the third difference signal $V_{D3}$ is binarized by a comparator 17 (a waveform processing section) and passes through an output buffer circuit 19. Then, the third difference signal $V_{D3}$ is output from an output terminal 23 on a substrate 2. Here, reference numeral 21 designates a power supply terminal for supplying power voltage to each circuit element on the substrate and reference numeral 25 designates a ground terminal.

FIG. 4 shows a specific example of the sensor control circuit 29 of FIG. 3. The first MR bridge 3 is constituted as a full bridge by combining two half bridges of the magnetic field detecting sections 38a and 38b, each of which consists of a pair of the resistive elements (MR elements) 37a and 37b connected serially. Each half bridge is connected to the power supply voltage Vcc at one end and to the ground at the other end and the output voltages $V_{s1}$ and $V_{s2}$ at the resistance voltage dividing points are input to two operational amplifiers 7a and 7b constituting the first preamplifier 7. The second MR bridge 5 is also constituted as a similar full bridge and the output voltages $V_{s3}$ and $V_{s4}$ at the resistance voltage dividing points of each half bridge are input to two operational amplifiers 9a and 9b constituting the second preamplifier 9.

The first preamplifier 7 is a differential amplifier constituted by the operational amplifiers 7a and 7b for differentially amplifying the output voltages $V_{s1}$ and $V_{s2}$ from the first MR bridge 3, wherein output paths and negative feedback paths of each of the operational amplifiers 7a and 7b are connected in parallel via resistors 40, 42, 44 and 46. The resistors 40, 42, 44 and 46 are intended for determining gain and the resistors 40 and 46 are set to the same resistance value R1 and the resistors 42 and 44 are set to the same resistance value R2 so that the gain of the first difference signal $V_{D1}$ or the output of the differential amplifier is given as 1+(R1/R2). The second preamplifier 9 is also a differential amplifier constituted by the operational amplifiers 9a and 9b and resistors 48, 50, 52 and 54 for gain determination in a manner precisely similar to the first preamplifier 7 for differentially amplifying the output voltages $V_{s3}$ and $V_{s4}$ from the second MR bridge 5 and outputting the second difference signal $V_{D2}$ or the differential amplification output. Further, the main amplifier 11 is also a similar differential amplifier constituted by operational amplifiers 11a and 11b and resistors 56, 57, 5B and 59 for gain determination for differentially amplifying the first difference signal $V_{D1}$ and the second difference signal $V_{D2}$ input thereto and outputting the third difference signal $V_{D3}$ or the differential amplification output.

The third difference signal $V_{D3}$ is input to a comparator 17 comprised of operational amplifiers that binarizes (converts into a square wave) the third difference signal $V_{D3}$ that is an output waveform signal of the sensor by using the divided voltage of resistors 68 and 69 as a threshold voltage $V_{TH}$. In this embodiment, as both of the voltage dividing resistors 68 and 69 for determining the threshold voltage $V_{TH}$ are fixed resistors, the threshold voltage $V_{TH}$ is constant. In this connection, the output buffer circuit 19 is comprised of a voltage follower using an operational amplifier.

Next, the offset correction circuit 13 (a threshold adjusting and setting section) is a circuit for generating an offset adjusting voltage $V_{OFF}$. In this embodiment, the offset adjusting voltage $V_{OFF}$ is set by adjusting the voltage division of the power supply voltage Vcc by voltage dividing resistors 60 and 61 and is output via an operational amplifier 13a acting as a voltage follower and superimposed on the third difference signal $V_{D3}$. One of the voltage dividing resistors 60 and 61 is comprised of a variable resistor 61 so that the offset adjusting voltage $V_{OFF}$ can be changed or adjusted by adjusting the resistance value of the variable resistor 61. As a result, the sensor output waveform based on the third difference signal $V_{D3}$ is shifted to the higher or lower voltage side evenly according to the level of the superimposed offset adjusting voltage $V_{OFF}$. Further, in this embodiment, as the threshold voltage $V_{TH}$ of the comparator 17 is set to a constant value, the threshold value level for binarizing the output waveform can be changed or adjusted relatively by changing the offset adjusting voltage $V_{OFF}$.

Further, the temperature correction circuit 15 (a temperature correcting section) is configured as follows. First, a correction coefficient voltage $V_K$ from the variable setting section (in this embodiment, it is comprised of voltage dividing resistors 66 and 67, one of which is a variable resistor 67) is input to the temperature correcting section that is mainly comprised of an operational amplifier 15a via an operational amplifier 15b acting as a voltage follower. The temperature correcting section has the operational amplifier 15a, a reference resistor 64 that is inserted into an input stage of the correction coefficient voltage $V_K$, and a temperature detection resistor 65 that is inserted as a feedback resistor and outputs a temperature correction voltage $V_T$ to be superimposed on the third difference signal $V_{D3}$. The temperature detection resistor 65 has a larger temperature coefficient of resistance but the temperature coefficient of resistance may be either positive or negative.

The gain of the operational amplifier 15a varies automatically following the variation of resistivity depending on temperature to output the temperature correction voltage $V_T$. When the amplification reference voltage of the operational amplifier 15a (given as the divided voltage of the resistors 62 and 63) is given as $V_A$, the resistance value of the feedback resistor 65 is given as a function of temperature R(T), and the resistance value of the reference resistor 64 is given as a constant $R_0$, the following equation holds:

$$V_A = V_K + (V_T - V_K) \cdot R_0/(R_0 + R(T)) \quad (1)'$$

and, therefore, the temperature correction voltage $V_T$ can be expressed as follows:

$$V_T = ((V_A - V_K)/R_0) \cdot R(T) + V_A \quad (1)$$

It can be seen that the first term of this equation is the temperature correction term and the contribution of the temperature correction term to the output waveform can be adjusted at will by adjusting the correction coefficient voltage $V_K$.

Therefore, in the circuit of FIG. 4, if the adjusted signal voltage to be binarized eventually is given as $V_F$, the following equation holds:

$$\begin{aligned} V_F &= V_{D3} + V_{OFF} + V_T \\ &= V_{D3} + (V_A + V_{OFF}) + ((V_A - V_K)/R_0) \cdot R(T) \end{aligned} \quad (2)$$

In this equation, the first term is the original waveform before adjustment (the third difference signal $V_{D3}$), the second term is the waveform offset value ($V_{OFF}$ is a variable offset value while the second term $V_A$ of the equation (1) contributes as a fixed offset value), and the third term is the temperature correction term.

In this connection, all operational amplifiers used in the circuit of FIG. 4 are single power supply amplifiers and, as is apparent from the circuit board configuration of FIG. 3, the power supply voltage Vcc is supplied only from one line (In this embodiment, the power is supplied from an external stabilized power supply via the terminal 21). Therefore, the differential amplification circuits constituting the preamplifiers 7 and 9 are provided with polarity ensuring circuits 7c and 9c, respectively, to prevent underflow of the differential amplification output to the negative voltage side. These polarity ensuring circuits 7c and 9c are attached to the ends of the respective strings of gain determining resistors interconnected serially to supply a polarity ensuring voltage $V_J$ (generated by adjusting voltage division of the power supply voltage Vcc by the voltage dividing resistors 70 and 71) via respective voltage followers. Both polarity ensuring circuits function similarly as in the preamplifier 7 and, according to the circuit theory of operational amplifiers, if the resistance value R2 of the intermediate resistors 42 and 44 is sufficiently large in comparison with the resistance value R1 of the resistors 40 and 46 at both ends, the differential amplification output (the first difference signal) $V_{D1}$ can be expressed by the following equation:

$$V_{D1} = (1 + R1/R2)(V_J + V_{s1} - V_{s2}) \quad (3)$$

On the other hand, if the polarity ensuring circuits 7c and 9c are replaced by grounds, for example, $V_{D1}$ is as follows:

$$V_{D1} = (1 + R1/R2)(V_{s1} - V_{s2}) \quad (4)$$

In the equation (4), when $V_{s1} < V_{s2}$, $V_{D1}$ takes a negative value and, therefore, the underflow may cause but, in the equation (3), even when $V_{s1} < V_{s2}$, so long as the absolute value of the difference is less than the polarity ensuring voltage $V_J$, it is ensured that the differential amplification output has a positive polarity.

Further, in the main amplifier 11, the offset correction circuit 13 and the temperature correction circuit 15 function also as a polarity ensuring circuit. Still further, as shown in the equation (1), as the temperature correction circuit 15 is configured so that the correction coefficient voltage $V_K$ is given as the difference from the amplification reference voltage $V_A$, the underflow of the output of the temperature correction circuit 15 is not likely to occur so long as $V_K$ does not exceed $V_A$.

Figure 5:
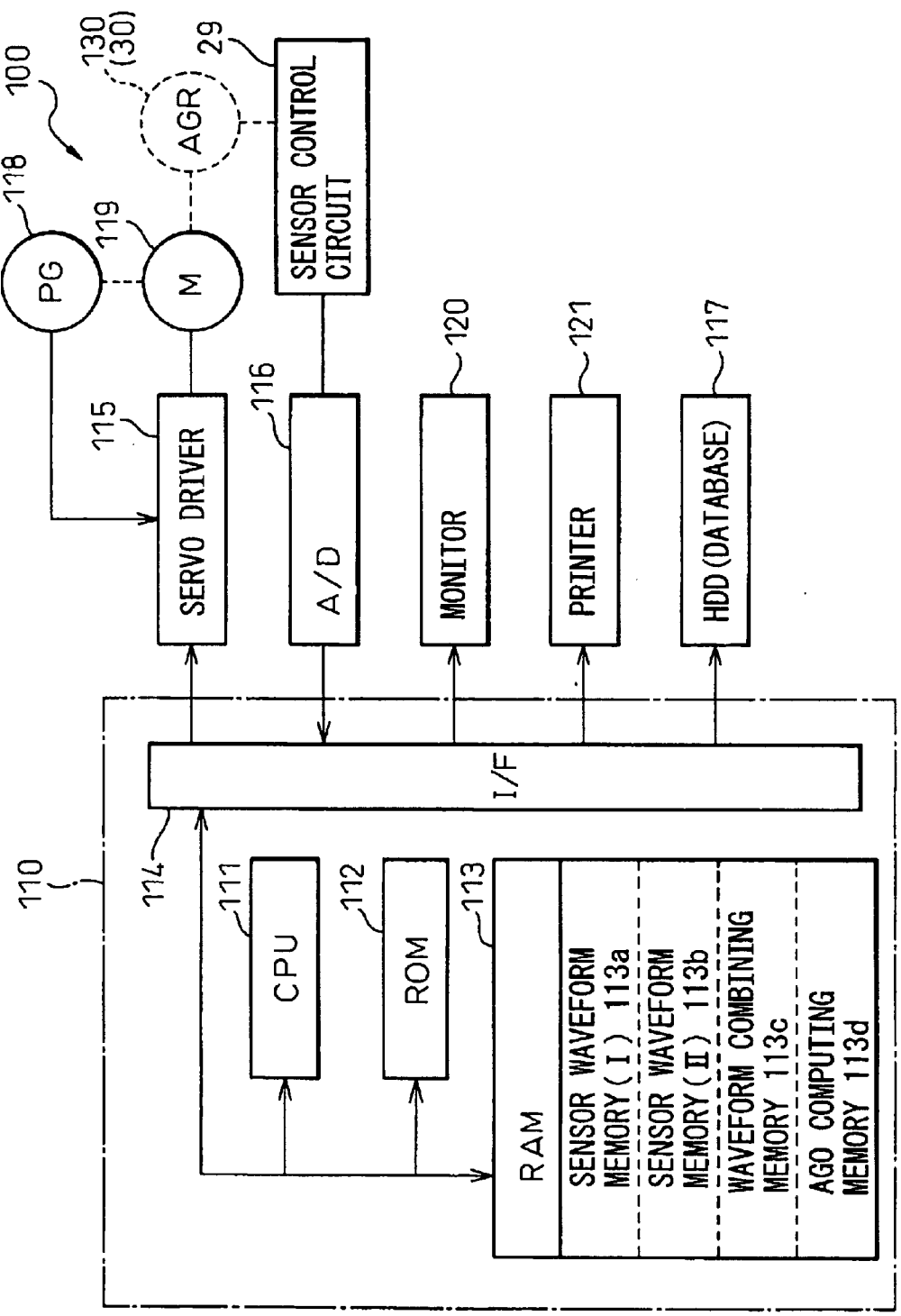
FIG. 5 is a block diagram showing an electrical configuration of an adjusting device of the magnetic sensor of the present invention.

Next, FIG. 5 is a block diagram showing an exemplary configuration of an adjusting device of a magnetic sensor using the sensor control circuit 29 of FIG. 4. The adjusting device 100 is mainly comprised of a microcomputer 110 provided with a CPU 111, a ROM 112, a RAM 113 and an input/output interface 114 and a program for control and analysis operations is stored in the ROM 112. Then, the CPU executes the program using the RAM 113 as a work area to implement via software functions of a detection waveform obtaining means and an intersection point level value calculating means. In this connection, functions of each memory in the RAM 113 will be described later. Further, a monitor 120 and a printer 121 for outputting data are connected to the input/output interface 114.

Following components of the device are connected to the microcomputer 110 via the input/output interface 114:

(1) a motor 119: it is servo-driven by a servo driver 115 which receives driving commands from the microcomputer 110 to rotate a variable-gap sensing target unit 130. The rotation angle of the motor 119 and, thus, the variable-gap sensing target unit 130 is detected by a pulse generator (that is comprised of an optical rotary encoder, for example) 118 and fed back to the servo driver 115;

(2) the sensor control circuit 29: the sensor output waveform is binarized by the circuit of FIG. 3 and, then, digitized by an A/D converter 116 and, then, input to the microcomputer 110; and (3) a database 117: is comprised of a hard disk drive (HDD) and the like, in which the captured waveform data, the calculation result of the intersection point level value and the like are stored.

Figure 7:
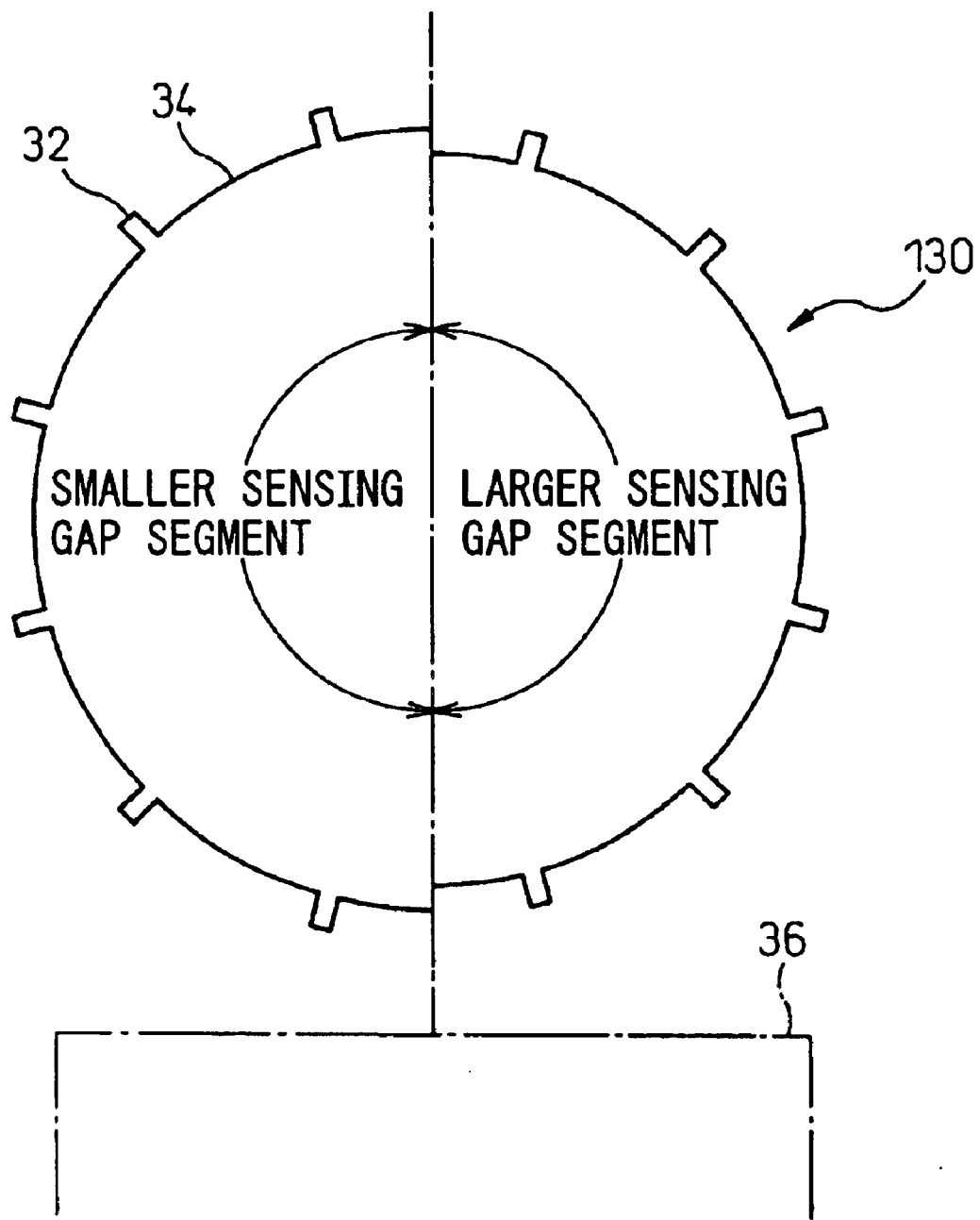
FIG. 7 is a plan view showing an example of a variable-gap sensing target unit.

FIG. 7 shows an example of the variable-gap sensing target unit 130.

Figure 8:
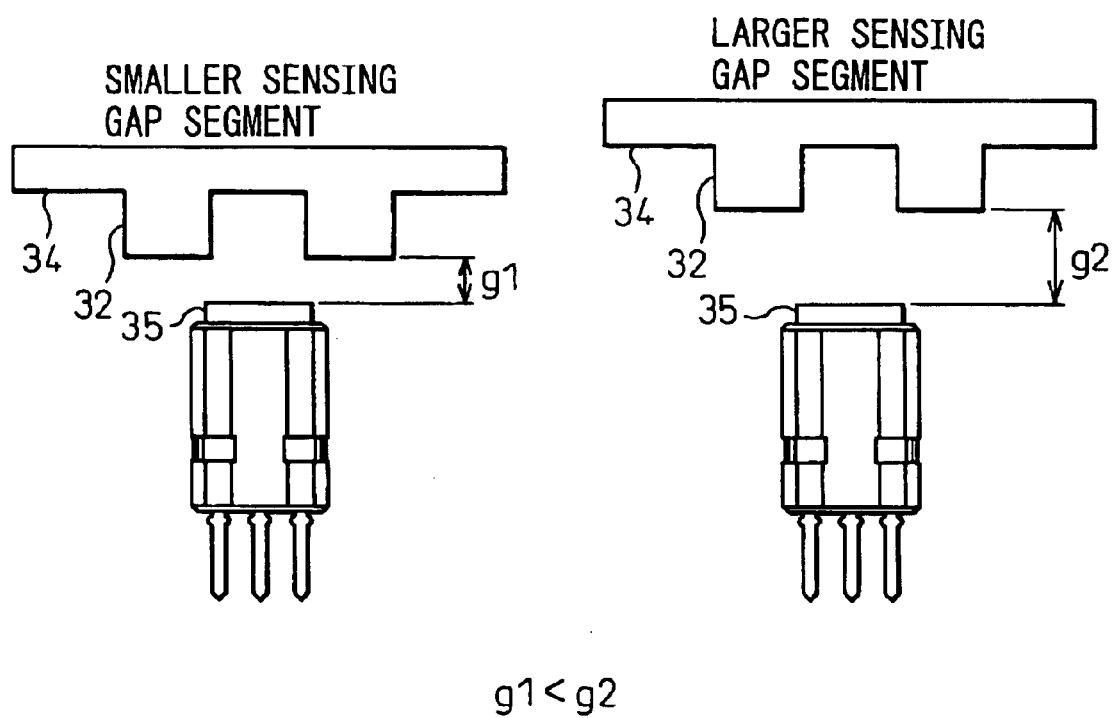
FIG. 8 is an operation explanatory view of the variable-gap sensing target unit.

Normally, the sensing target unit 30 as shown in FIG. 1 is attached to the magnetic sensor, wherein a sensing gap length g is constant. More specifically, the sensing target unit 30 has a constant radius, if ignoring the difference between the concave and convex portions. On the other hand, the variable-gap sensing target unit 130 is attached temporarily to the magnetic sensor to be adjusted so that it replaces the normal sensing target unit 30 described above and, in the variable-gap sensing target unit 130, segments having different sensing gap lengths coexist, as shown in FIG. 7. More specifically, as shown in FIG. 8, the variable-gap sensing target unit 130 has one segment that forms a sensing gap having a first length value g1 between itself and the magnetic field detecting section 35 (that corresponds to 38a, 38b, 40a and 40b in FIG. 1) that is positioned fixedly, and the other segment that forms a sensing gap having a second length value g2 that is larger than the first value g1. As shown in FIG. 7, each of above segments occupies 180 degrees of the circumference, respectively, so that the radius of the sensing target unit is changed (hereinafter, the former segment is referred to as the smaller sensing gap segment and the latter segment is referred to as the larger sensing gap segment). As apparent from the above, the variable-gap sensing target unit 130 constitutes a sensing gap length changing and setting means.

In this connection, though a rotating shaft of a rotation detection object to which the sensor is attached (such as, for example, a automobile's crankshaft or other shaft elements that rotate interlockingly with the crankshaft, the rotation of which is to be detected) is coupled to the normal sensing target unit 30, when it is replaced by the variable-gap sensing target unit 130, an output shaft of the motor 119 of FIG. 5 is attached to it.

Hereinafter, a method for adjusting the magnetic sensor using the adjusting device 100 will be described.

Figure 6:
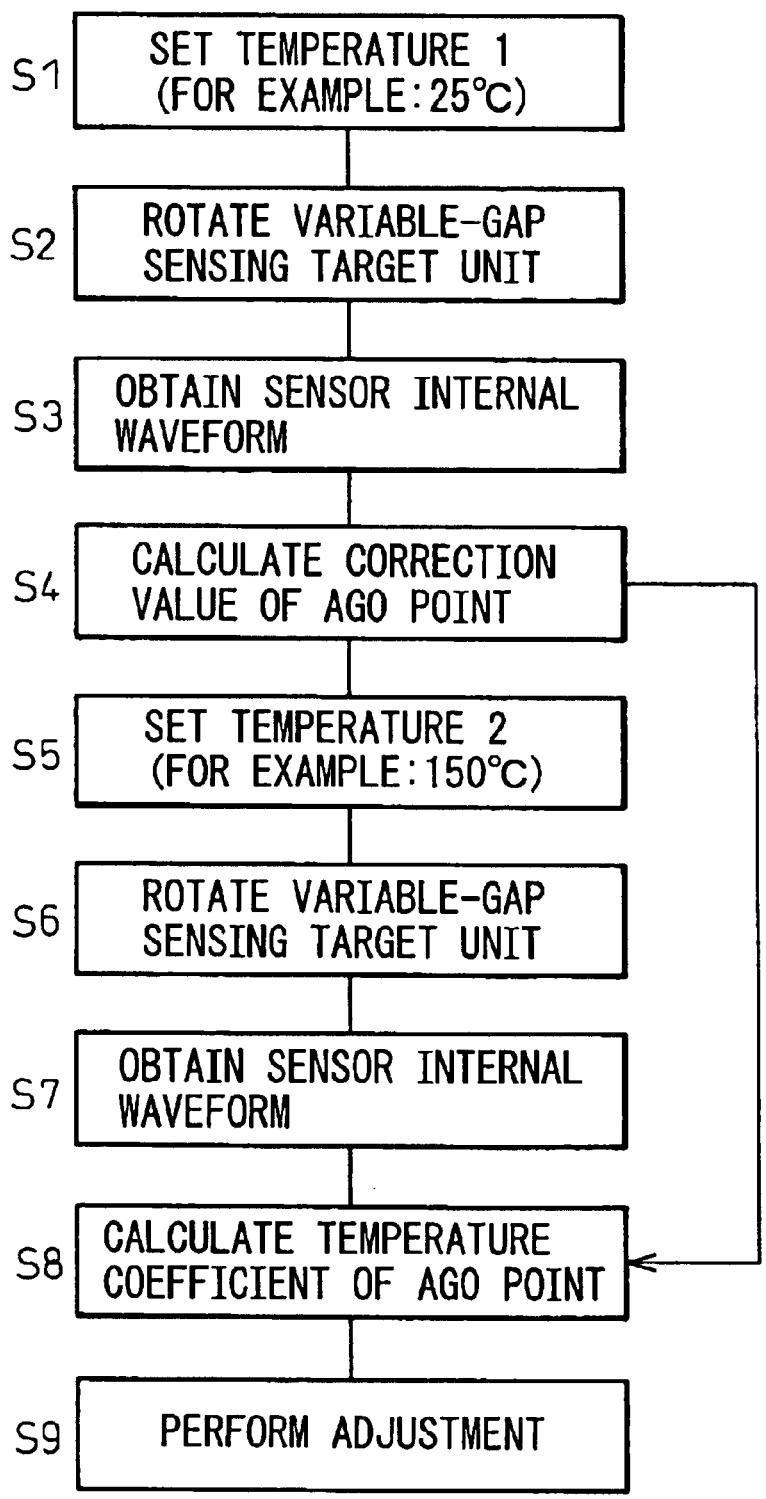
FIG. 6 is a flow chart showing an example of a procedure of an adjusting method of the magnetic sensor of the present invention.

First, in the sensor control circuit 29 of FIG. 4 in the sensor to be adjusted, the offset adjusting voltage $V_{OFF}$ and the temperature correction coefficient voltage $V_K$ are set to appropriate temporal values. Next, the normal sensing target unit 30 that is attached to the sensor normally is replaced by the variable-gap sensing target unit 130 of FIG. 7. At this time, the phase of the angle at which the larger sensing gap segment and the smaller sensing gap segment alternate each other is measured in advance by using the output of the pulse generator 118. Thus, the preparation work is completed as described above and, hereinafter, an adjustment procedure will be described with reference to FIG. 6.

First, the sensing section 101 is placed in a thermostatic chamber (not shown) and its temperature is set to a first value (that is 25° C. (room temperature) in this embodiment) (S1). After the temperature becomes stable, the variable-gap sensing target unit 130 is rotated by the motor 119 (FIG. 5) (S2). As a consequence, as shown in process 1 of FIG. 9, detected waveforms corresponding to the larger sensing gap segment and the smaller sensing gap segment, respectively, are output alternately every 180° from the sensor control circuit 29 and A/D converted and, then, captured in the microcomputer 110 of FIG. 5 (S3 of FIG. 6). At this time, the transition between the larger sensing gap segment and the smaller sensing gap segment is detected by referencing the count value of the pulse generator 118 so that the detected waveforms are divided into a waveform data signal 202 of the larger sensing gap segment, which is stored in a sensor waveform memory (I) 113a in the RAM 113, and a waveform data signal 201 of the smaller sensing gap segment, which is stored in a sensor waveform memory (II) 113b in the RAM 113 (see FIG. 5). Each waveform data signal is given as a set of two dimensional coordinates of the voltage level and the angular phase.

Figure 9:
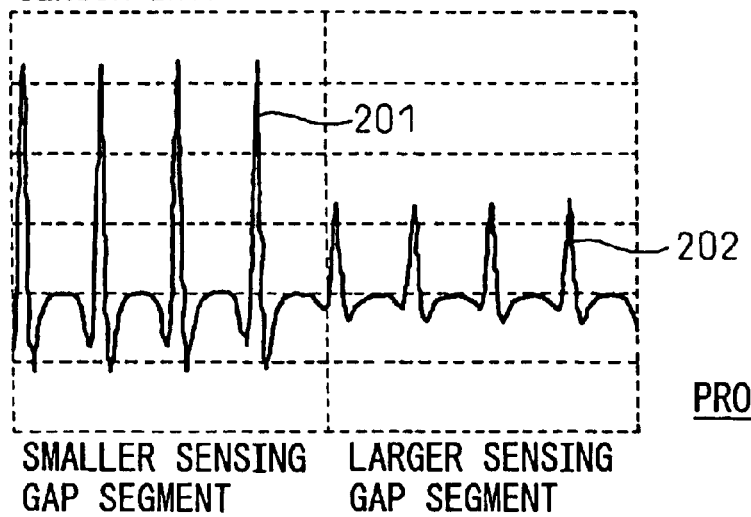
FIG. 9 is a process explanatory view showing an adjustment using the variable-gap sensing target unit.
Figure 9:
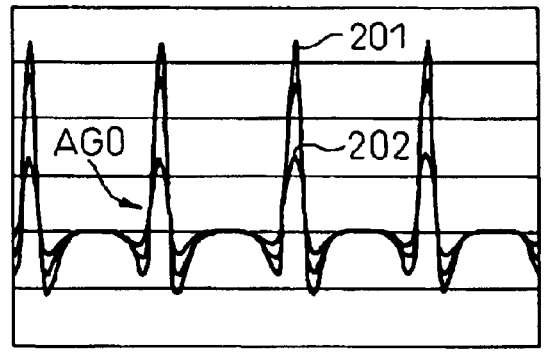
Figure 9:
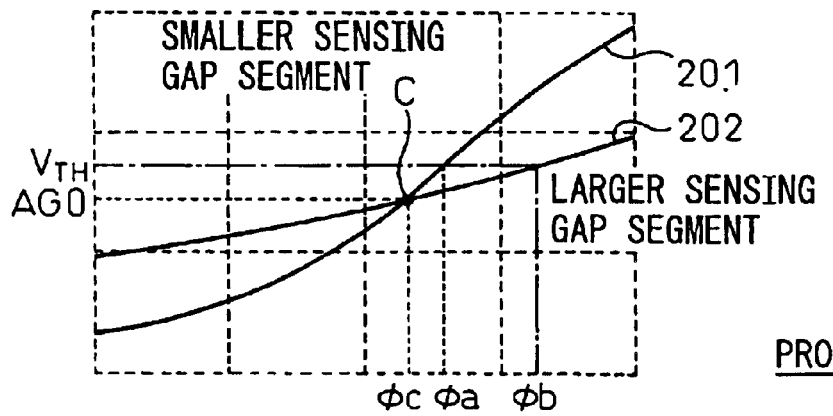

Next, the two divided waveform signals 201 and 202 are superimposed so that they are in phase as shown in process 2 of FIG. 9. This operation is performed in a waveform combining memory 113c in the RAM 113 by superimposing the waveform data signal in the sensor waveform memory (I) 113a and the waveform data signal in the sensor waveform memory (II) 113b so that they are in phase. Here, if the larger sensing gap segment and the smaller sensing gap segment are configured in advance so that the angular widths of the concave and convex portions and the spacing between them are identical and, further, the starting phase of the concavo-convex profile coincides between the both segments, the top phase of the divided waveform data signals can be aligned to each other and, therefore, the superimposing operation can be performed in an easier way.

Returning to FIG. 9, an intersection point C occurs between the superimposed waveforms 201 and 202, as shown in process 3 and in an enlarged manner. Thus, by using an AG0 computing memory 113d of FIG. 5, a point where the both waveform data signals agree with each other or coordinate data in which the voltage level and the angular phase agree between both waveform data signals is retrieved and determined as the coordinates of the intersection point C. Further, the difference ΔV (=$V_{TH}$−AG0) between the threshold voltage $V_{TH}$ and the intersection point level value AG0 is calculated and output to the monitor 120 or the printer 121 of FIG. 5 (S4 in FIG. 6).

Figure 10:
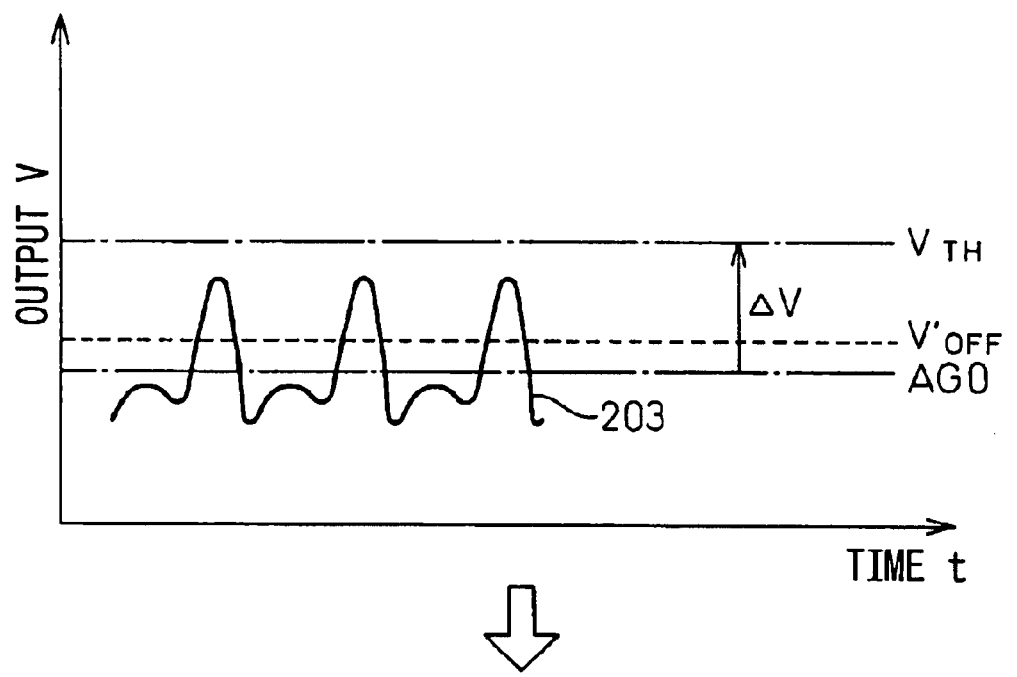
FIG. 10 is a diagram for describing how an intersection point level value is allowed to agree with a threshold by offset adjustment.
Figure 10:
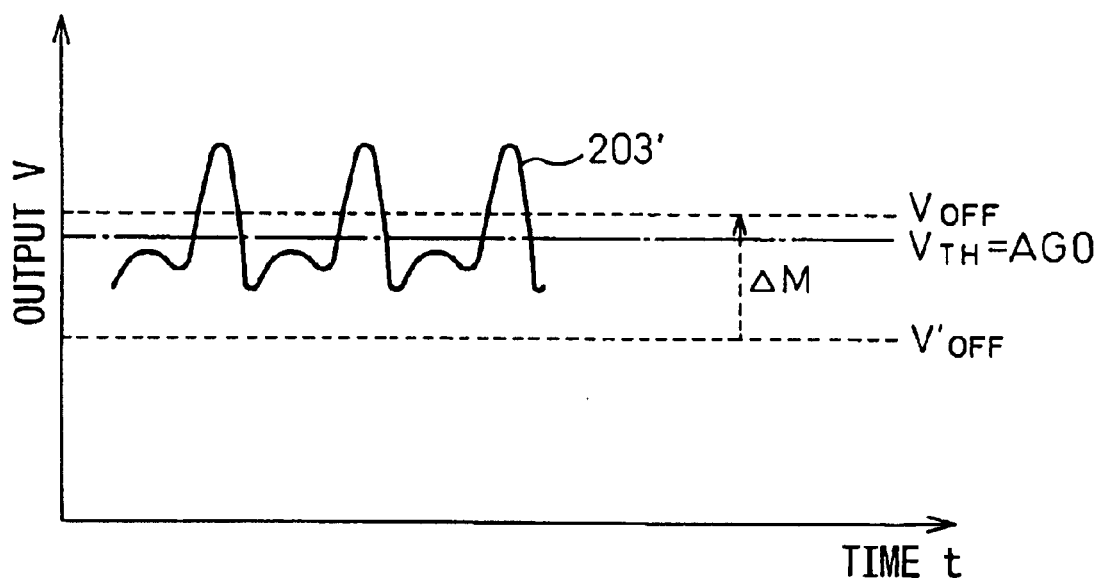

Next, the waveform output VF is adjusted so that the intersection point level value AG0 determined as described above agrees with the threshold voltage $V_{TH}$ of the comparator 17 in the sensor control circuit of FIG. 4. As shown in FIG. 10, if the above ΔV is a negative value, which means that AG0 is shifted to the side where the threshold voltage $V_{TH}$ is too low by ΔV, AG0 can be aligned with $V_{TH}$ by increasing the offset adjusting voltage $V_{OFF}'$ that has been set initially by ΔV to the adjusted offset adjusting voltage $V_{OFF}$ so that its waveform is shifted to the side of the higher voltage. On the other hand, if ΔV is a positive value, which means that AG0 is shifted to the side where the threshold voltage $V_{TH}$ is too high by ΔV, the offset adjusting voltage $V_{OFF}'$ should be increased by ΔV so that its waveform is shifted to the side of the lower voltage. Concretely, this adjustment is performed by changing the resistance value of the variable resistor 61 of FIG. 4.

Returning to FIG. 6, in S5, the temperature is set to a second value (that is a higher temperature corresponding to the upper limit of the operating temperatures of the sensor (for example, 150° C.) in this embodiment). Then, in S6, S7 and S8, operations completely similar to S2, 53 and S4 are repeated to calculate the values of AG0 and ΔV in the second temperature. As AG0 is offset from $V_{TH}$ again due to the temperature increase, depending on temperature characteristics of the output waveform, AG0 is adjusted to agree with $V_{TH}$ by changing the temperature correction voltage VT. As a result, AG0 can be aligned with VTH substantially over the full range of the first and second temperatures. Concretely, the adjustment is performed by changing the resistance value of the variable resistor 67 of FIG. 4 and, thus, the correction coefficient voltage Here, the specific adjustment value of the correction coefficient voltage $V_K$ can be calculated by using the temperature correction term $((V_A−V_K)/R_0)·R(T)$ in the equation (2). More specifically, when the first temperature is $T_P$ and the second temperature is $T_S$, the variation $ΔV_T$ of the temperature correction term due to the temperature change according to the $V_K$ that is set initially can be expressed as follows:

$$ΔV_T = ((V_A − V_K)/R_0)·R(T_S) − ((V_A − V_K)/R_0)·R(T_P) \quad (5)$$
$$= ((V_A − V_K)/R_0)(R(T_S) − R(T_P))$$

On the other hand, defining the decrement of AG0 itself, due to the temperature increase when the temperature correction is not performed, as ΔAG0, considering the fact that the result of the effect of the above variation $ΔV_T$ of the temperature correction term on ΔAG0 as the cancellation term appears as an offset ΔV between the present ΔAG0 and $V_{TH}$, the following equation holds:

$$ΔAG0 − ΔV_T = ΔV \quad (6)$$

On the other hand, in (5), assuming that the $ΔV_T$ is changed to $ΔV_T'$ by changing VK to VK', the following equation holds:

$$ΔV_T' = ((V_A − V_K')/R_0)(R(T_S) − R(T_P)) \quad (7)$$

Then, assuming that ΔV becomes zero after this change, the following equation holds:

$$ΔAG0 − ΔV_T' = 0 \quad (8)$$

Then, eliminating ΔAG0 from (6) and (8), the following equation holds:

$$ΔV_T' − ΔV_T = ΔV \quad (9)$$

and, substituting (5) and (7) into this equation, the following equation can be obtained:

$$VK' − VK = −ΔV·R0/(R(T_S) − R(T_P)) \quad (10)$$

Here, VK'−VK represents the adjustment value of the correction coefficient voltage and it can be calculated by using ΔV obtained in the measurement described above, if $R(T_S)$ and $R(T_P)$ are known in advance.

After completing the adjustment as described above, the magnetic sensor in which the threshold is adjusted can be obtained by removing the variable-gap sensing target unit 130 and attaching the normal sensing target unit 30 in place of the variable-gap sensing target unit 130.

An effect of adjusting the magnetic sensor so that the binarization threshold $V_{TH}$ agrees with the intersection point level value of the output waveform AG0 is as shown in process 3 of FIG. 9. Thus, if the threshold $V_{TH}$ does not agree with the intersection point level value AG0, as the sensing gap length varies, each waveform intersects the threshold $V_{TH}$ at different phases (φa, φb) and, as a result, a significant variation occurs in the phase of the level edges after the binarization. This variation leads to reduced accuracy in detecting angles due to unevenness of the sensing gap length. However, if the threshold $V_{TH}$ agrees with the intersection point level value AG0, even when the sensing gap length varies, each waveform always intersects the threshold $V_{TH}$ at the same phase (φc) and the level edges after the binarization remain invariant and, therefore, the accuracy in detecting angles can be increased. This effect is exhibited with regard to the unevenness of the sensing gap length due to uneven attachment of the sensing target units 30 between different sensors as well as the unevenness of the sensing gap length due to eccentricity of the rotation axis line of the sensing target unit 30, irregularity of heights of the concave and convex portions and the like of the sensing target unit 30 in one sensor.

Further, in this embodiment, as the second magnetic field detecting sections 40a and 40b are provided additionally as shown in FIG. 1 so as to use the third difference signal described above, there is an effect in that the intersection point level value AG0 can be maintained constant even if the width (the lateral length) of the convex portion 32 or the concave portion 34 is uneven. Still further, in actual magnetic sensors, in which various sensing target units having the concave and convex portions of different widths are used according to their aims, when the second magnetic field detecting sections 40a and 40b are not used, the intersection point level value AG0 may differ between the sensing target units having the concave and convex portions of different widths even if the sensing gap lengths are identical. Therefore, the variable-gap sensing target units 130 of different types must be provided for adjustment of the various sensing target units. However, if the second magnetic field detecting sections 40a and 40b are added, the intersection point level values AG0 agree between the sensing target units having the convex portion 32 or concave portion 34 of somewhat different widths if only the sensing gap lengths are identical and, therefore, the variable-gap sensing target unit 130 can be shared between these sensing target unit products.

In this connection, it can be determined whether the binarization threshold $V_{TH}$ of the magnetic sensor that has already been adjusted actually agrees with the intersection point level value AG0 or not in the following manner. First, when the sensing gap length tends to fluctuate according to the phase of the rotation angle due to the eccentricity, irregularity of the concave and convex portions and the like of the attached sensing target unit 30 itself, the intersection point level value AG0 may be found by sampling the waveforms of the phase segments that differ from each other significantly and superimposing them on each other. But, even if it is difficult to find the phase segments having significant differences, the intersection point level value AG0 can be found easily, for example, by moving the magnetic field detecting sections 38a, 38b, 40a and 40b that have been already attached or replacing the sensing target unit 30 with another one having a different sensing gap length to change the sensing gap length from the specified value forcibly and, then, measuring the detection waveforms before and after the change. After that, it is possible to determine whether the threshold $V_{TH}$ agrees with the intersection point level value AG0, that has been found as described above, or not.

We claim:

1. A method for adjusting a magnetic sensor including:

a magnet for generating a magnetic field;

a sensing target unit in which a first sensed portion and a second sensed portion are magnetically inequivalent to each other, are disposed along a moving path passing through a position opposed to said magnet through a magnetic gap and can be moved integrally along said moving path;

a magnetic field detecting section for detecting magnetic field fluctuations in said magnetic gap based on the fact that said first sensed portions and said second sensed portions pass through said magnetic gap alternately;

a waveform processing section for binarizing detection waveform detected by said magnetic field detecting section based on a predetermined threshold; and a threshold adjusting and setting section for setting said threshold so that it can be adjusted relatively with respect to said detection waveforms, the method comprising the steps of:

obtaining detection waveforms for a plurality of setting values by said magnetic field detecting sections while changing sensing gap lengths, which are formed between said first sensed portion or said second sensed portion and said magnetic field detecting section in said magnetic gap, among said plurality of setting values;

calculating an intersection point level value indicated by an intersection point between a plurality of detection waveforms detected for said plurality of setting values when said plurality of detection waveforms are superimposed in phase; and adjusting said threshold so that it agrees with said intersection point level value.

2. The method for adjusting a magnetic sensor according to claim 1, wherein said plurality of setting values are set at two levels, and said calculating step comprises the step of calculating an intersection point level value that is indicated by an intersection point between two detection waveforms.

3. The method for adjusting a magnetic sensor according to claim 1, wherein said sensing target unit is a variable-gap sensing unit for adjustment which is attached to said magnetic sensor in place of a normal sensing target unit having a constant sensing gap length and in which segments having different sensing gap lengths coexist, and said step of obtaining detection waveforms comprises the step of obtaining said detection waveforms according to said first sensed portion and said second portion for each of the segments of said variable-gap sensing target unit having said different sensing gap lengths.

4. The method for adjusting a magnetic sensor according to claim 3, wherein said normal sensing target unit is a body of revolution, a locus of a circumferential side surface about a rotation axis line of said body of revolution constitutes said moving path, and said first sensed portion and said second sensed portion are disposed alternately along said circumferential side surface, and said variable-gap sensing unit is a body of revolution, a plurality of segments having turning radii different from each other are disposed along a circumferential side surface about a rotation axis line of said body of revolution and said first sensed portion and said second sensed portion are disposed in each of the plurality of segments so that said plurality of segments have said sensing gap lengths different from each other.

5. The method for adjusting a magnetic sensor according to claim 1, wherein said magnetic sensor further includes a temperature correcting section for correcting temperature-dependent fluctuations of the detection waveforms detected by said magnetic field detecting section, and the method further comprising the step of:

setting by said temperature correcting section a correction coefficient so that said threshold agrees with said intersection point level value over substantially all predetermined temperature ranges.

6. The method for adjusting a magnetic sensor according to claim 4, wherein said magnetic sensor further includes a temperature correcting section for correcting temperature-dependent fluctuations of the detection waveforms detected by said magnetic field detecting section, and the method further comprising the step of:

setting by said temperature correcting section a correction coefficient so that said threshold agrees with said intersection point level value over substantially all predetermined temperature ranges.

7. The method for adjusting a magnetic sensor according to claim 5, wherein said step of setting said correction coefficient further comprising the steps of:

obtaining two detection waveforms by said magnetic field detecting section and allowing said threshold to agree with a first intersection point level value, which is determined by said two detection waveforms, by said threshold adjusting and setting section while a temperature is set to a first temperature and two levels of said sensing gap lengths are used;

obtaining two detection waveforms by said magnetic field detecting section again and calculating a second intersection point level value determined by said two detection waveforms that are detected again while the threshold set by said threshold adjusting and setting section is not changed, said temperature is changed to a second temperature that is different from said first temperature and two levels of said sensing gap lengths are used; and setting said correction coefficient so that said second intersection point level value agrees with said threshold.

8. A device for adjusting a magnetic sensor, comprising:

a magnet for generating a magnetic field;

a sensing target unit in which a first sensed portion and a second sensed portion are magnetically inequivalent to each other, are disposed along a moving path passing through a position opposed to said magnet through a magnetic gap, and can be moved integrally along said moving path;

a magnetic field detecting section for detecting magnetic field fluctuations in said magnetic gap based on the fact that said first sensed portions and said second sensed portions pass through said magnetic gap alternately;

a waveform processing section for binarizing detection waveform detected by said magnetic field detecting section based on a predetermined threshold;

a threshold adjusting and setting section for setting said threshold so that it can be adjusted relatively with respect to said detection waveforms;

a sensing gap length changing and setting section for changing and setting sensing gap lengths, which are formed between said first sensed portion or said second sensed portion and said magnetic field detecting section in said magnetic gap, among a plurality of setting values;

a detection waveform obtaining section for obtaining detection waveforms for said plurality of setting values by said magnetic field detecting section; and an intersection point level value calculating section for calculating an intersection point level value indicated by an intersection point between a plurality of detection waveforms detected for said plurality of setting values when said plurality of detection waveforms are superimposed in phase.

9. The device for adjusting a magnetic sensor according to claim 8, wherein said plurality of setting values are set at two levels, said detection waveform obtaining section obtains two detection waveforms, and said intersection point level value calculating section calculates an intersection point level value from said two detection waveforms as a target value with which said threshold should agree.

10. The device for adjusting a magnetic sensor according to claim 9, wherein said sensing target unit is a variable-gap sensing unit for adjustment which is attached to said magnetic sensor in place of a normal sensing target unit having a constant sensing gap length and in which segments having different sensing gap lengths coexist, and said detection waveform obtaining section obtains said detection waveforms according to said first sensed portion and said second portion for each of the segments of said variable-gap sensing target unit having said different sensing gap lengths while said magnet is attached to a fixed position.

11. The device for adjusting a magnetic sensor according to claim 10, wherein said normal sensing target unit is a body of revolution, a locus of a circumferential side surface about a rotation axis line of said body of revolution constitutes said moving path, and said first sensed portion and said second sensed portion are disposed alternately along said circumferential side surface, and said variable-gap sensing unit is a body of revolution, a plurality of segments having turning radii different from each other are disposed along a circumferential side surface about a rotation axis line of said body of revolution and said first sensed portion and said second sensed portion are disposed in each of the plurality of segments so that said plurality of segments have said sensing gap lengths different from each other.

12. A magnetic sensor, comprising:

a magnet for generating a magnetic field;

a sensing target unit in which a first sensed portion and a second sensed portion are magnetically inequivalent to each other, are disposed along a moving path passing through a position opposed to said magnet through a magnetic gap, and can be moved integrally along said moving path;

a magnetic field detecting section for detecting magnetic field fluctuations in said magnetic gap based on the fact that said first sensed portions and said second sensed portions pass through said magnetic gap alternately;

a waveform processing section for binarizing detection waveform detected by said magnetic field detecting section based on a predetermined threshold; and a threshold adjusting and setting section for setting said threshold so that it can be adjusted relatively with respect to said detection waveforms, wherein a first detection waveform is obtained by changing a sensing gap length, which is defined to be a predetermined specific value between said first sensed portion or said second sensed portion and said magnetic field detecting section in said magnetic gap, from said specific value forcibly, a second detection waveform is obtained according to the sensing gap length that is defined to be said specific value and said threshold is adjusted so that it agrees with an intersection point level value that is indicated by an intersection point between said first detection waveform and said second detection waveform when said first detection waveform and said second detection waveform is superimposed in phase.

* * * * *